Patented Sept. 14, 1926.

1,599,563

UNITED STATES PATENT OFFICE.

AUGUSTUS H. FISKE, OF WARREN, RHODE ISLAND, ASSIGNOR TO RUMFORD CHEMICAL WORKS, OF PROVIDENCE, RHODE ISLAND, A CORPORATION OF RHODE ISLAND.

YEAST ASSISTANT.

No Drawing.  Application filed June 3, 1925. Serial No. 34,736.

My present invention relates to bread making and particularly to the assistance of the fermentation of the yeast by providing the yeast with a stimulant by which the growth of the yeast plant will be hastened and strengthened.

Various assistants have been tried and many announced as ineffective or undesirable. Curiously one of the mentioned ineffective substances I have discovered is not only effective, but highly so.

In attacking the problem I conceived the idea that the nitrate field would afford the basis of stimuli needed to effect the desired result. Nitrates have been tried and declared ineffective but I believed their use possible. I, therefore, have worked from that basis and have developed my present invention.

In it I deliberately use a nitrate such as potassium nitrate $KNO_3$ or the like, and I find that it gives a high development of the yeast growth. The field has been variously covered as to many salts containing oxygen such as bromides, persulphates or peroxides, and have been variously introduced.

By reason and by test, the nitrates are definitely useful and specifically successful and provide a very practical stimulus to yeast fermentation in bread making.

Without diversion as to theory, I will proceed to discuss the more practical applications of my invention. In my practice I introduce a nitrate, preferably in admixture with other yeast food materials, as for example calcium phosphates, ammonium chloride, salt and other ingredients required for specific purpose.

In order to make such mixture effective in practice, I provide for distribution in the flour in processing so that it will be effectual under commercial conditions.

It will be understood that the amount involved is very small, approximately 1% or less. I, therefore, propose to extend this element by an admixture. In this connection there are certain well known and available media that are attributive to bread making and I, therefore, propose as a specific instance to combine my nitrate with some of these ingredients.

As illustrative of a practical application of my invention I may proceed as follows: I may make a mixture of 25 parts of salt, 25 parts of calcium sulphate, 10 parts of calcium phosphate, 10 parts of ammonium chloride, 1 part of potassium nitrate and 29 parts of corn starch or flour or other edible vegetable powdered material to make up 100 parts. This mixture is then to be added to the flour for the manufacture of bread in the proportion of one pound of the material to a barrel of one hundred and ninety-six pounds of flour.

Instead of potassium nitrate, I may use sodium nitrate, ammonium nitrate or other non-deliquescent nitrates. These non-deliquescent nitrates are very effective and may be used in the same proportion as the potassium nitrate. Such non-deliquescent nitrates are more practical and satisfactory in action from the manufacturing standpoint than other deliquescent nitrates.

I do not, of course, intend to limit myself to any such proportions nor to any specific ingredient. I only assert that I have discovered or invented the basis or combination by which nitrates are made not only possible yeast stimuli, but most valuable and profitable assistants to all the various means for assisting, extending or augmenting the growth of the yeast plant in such a product as bread.

What I therefore claim and desire to secure by Letters Patent is:

1. As a yeast assistant in the making of leavened bread or the like, a product comprising a non-deliquescent dry edible substance, and a nitrate such as sodium nitrate dispersed therein.

2. As a yeast assistant in the making of leavened bread or the like, a product comprising a dry edible substance, and a sodium nitrate dispersed therein.

3. As a yeast assistant in the making of leavened bread or the like, a dispersion medium adapted to be distributed in a dough, and a non-deliquescent nitrate incorporated therein.

In testimony whereof I affix my signature.

AUGUSTUS HENRY FISKE.